United States Patent [19]
Pajevic

[11] 3,751,811
[45] Aug. 14, 1973

[54] MEASURING DEVICE
[76] Inventor: Paul Pajevic, 475 N. Northwest Hwy., Park Ridge, Ill. 60068
[22] Filed: Sept. 15, 1971
[21] Appl. No.: 180,561

[52] U.S. Cl. .............................................. 33/141 R
[51] Int. Cl. ............................................... G01b 3/12
[58] Field of Search ................... 33/125 M, 141 R, 33/166, 129; 235/95 R, 91 R

[56] References Cited
UNITED STATES PATENTS
2,741,031   4/1956   Martin et al. ..................... 33/141 R
2,878,566   3/1959   Mellen .............................. 33/141 R
3,311,985   4/1967   Hodge ............................... 33/141 R Primary Examiner—Harry N. Haroian
Attorney—Clarence A. O'Brien and Harvey B. Jacobson

[57] ABSTRACT

A friction wheel measuring apparatus for measuring distances traveled along a machine surface, said apparatus including a counting wheel with a circular groove containing a continuous number of balls each of which actuates a counting mechanism during rotation of the counting wheel, said counting wheel being driven by tapered motion transfer rollers which are axially adjustable with respect to each other to change the diameter ratio therebetween for compensation of measuring errors due to gathering effect and wear of the internal parts over a period of time.

24 Claims, 7 Drawing Figures

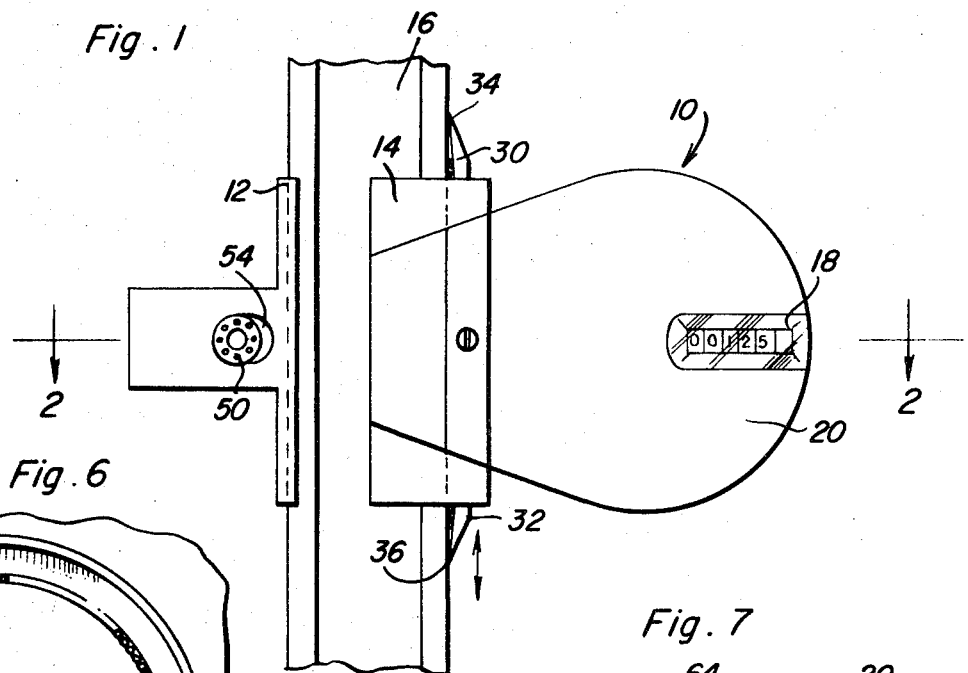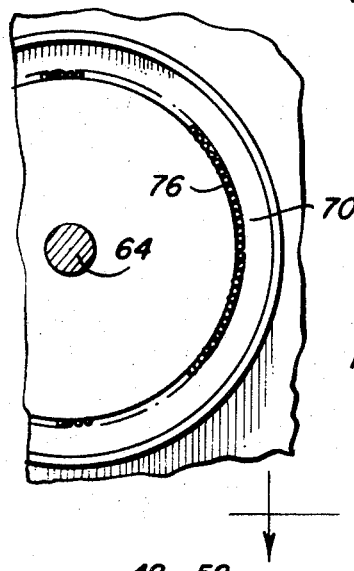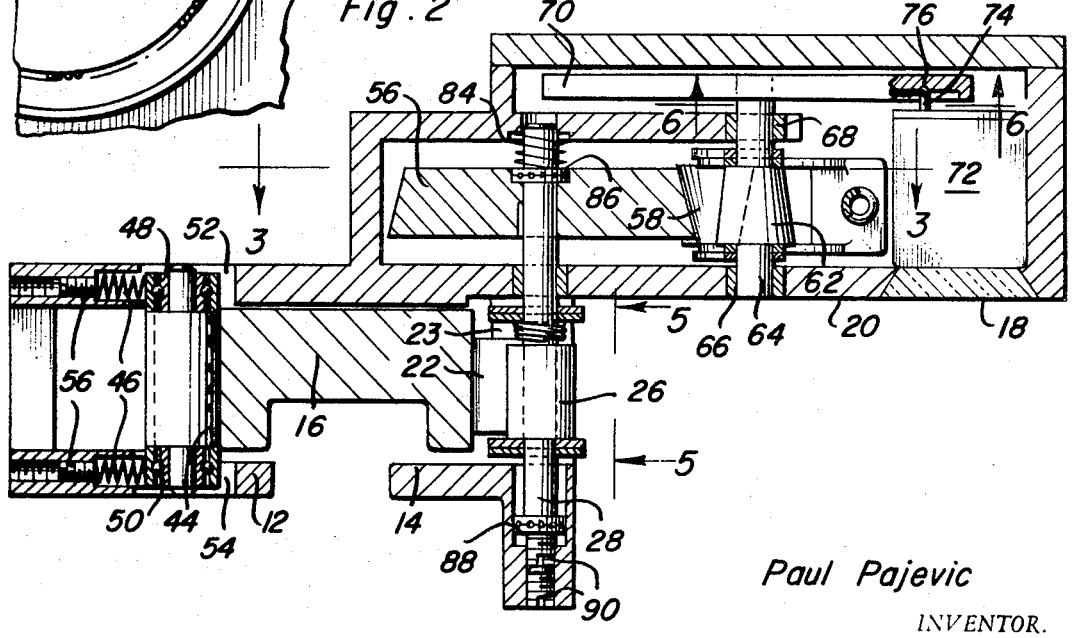
Paul Pajevic
INVENTOR.

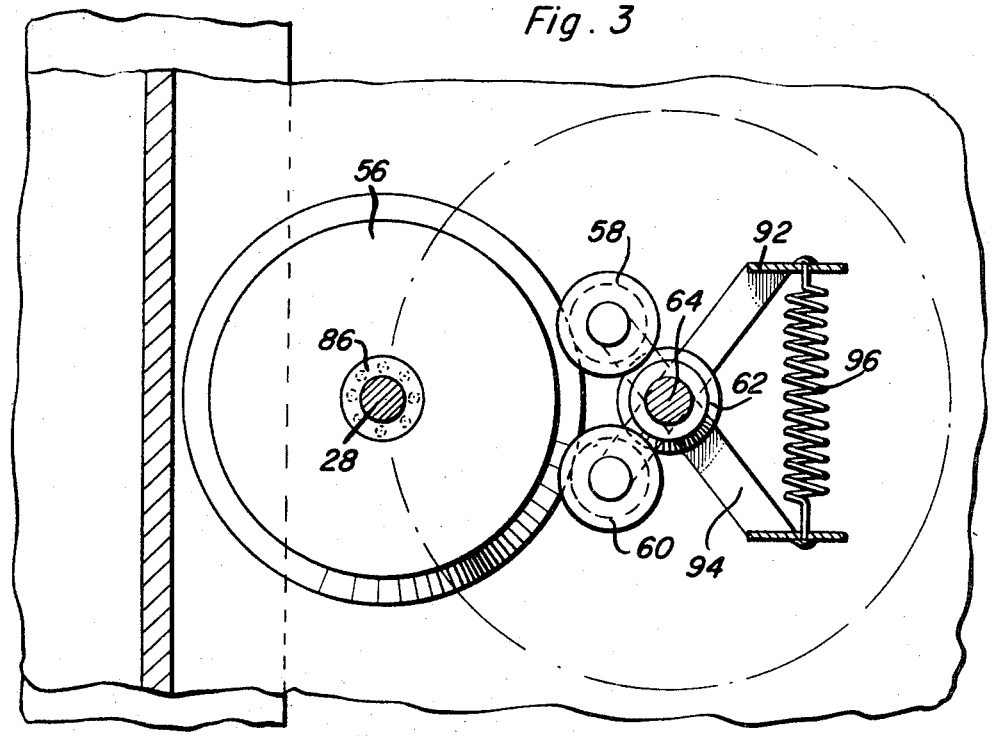
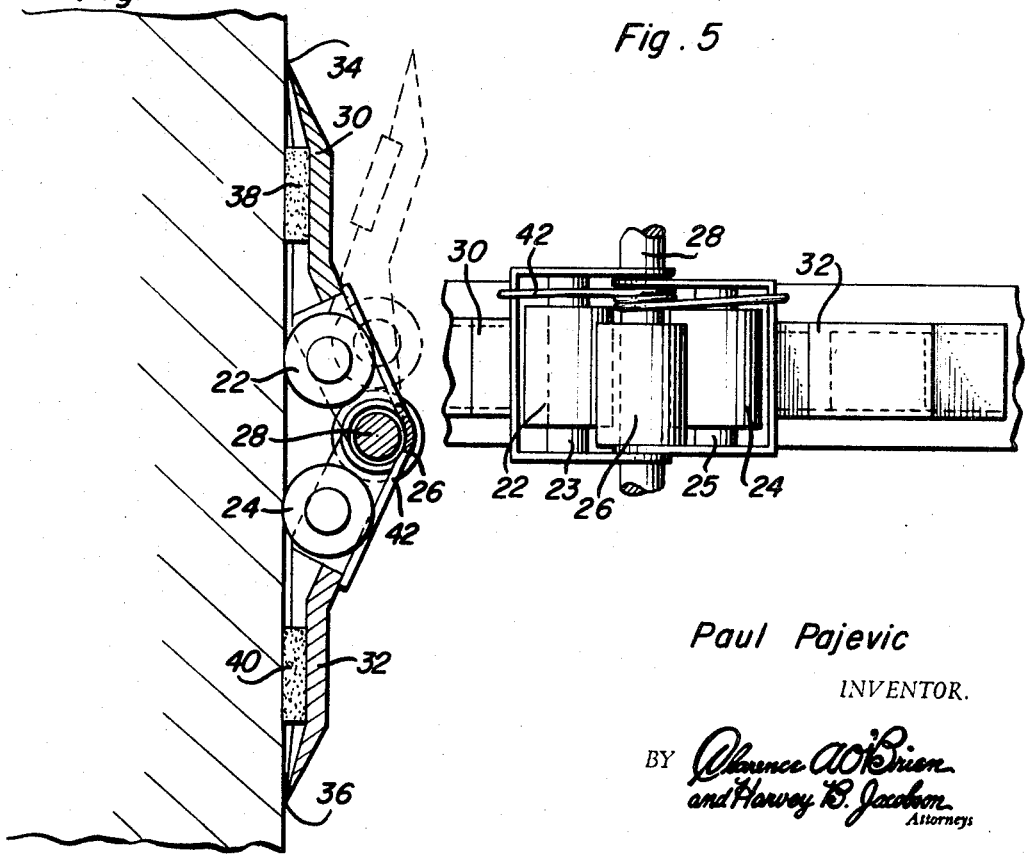
Paul Pajevic
INVENTOR.

MEASURING DEVICE

The present invention is generally related to measuring devices and, more particularly, to friction wheel devices for measuring the distance of travel along a surface associated with a piece of machinery or the like. The invention is intended primarily for use on machine tools where, in response to relative travel between first and second guiding members of the machine tool, the apparatus provides a measurement of the relative travel between a cutting member and the work being machined, such as on engine lathes, milling machines, shaving machines, drill presses, and the like.

Nearly all machines of this type include a pair of guiding members, one of which moves relative to the other to produce travel between the cutting member and the workpiece. For example, such a pair of guiding members may take the form of a carriage and a bed associated with an engine lathe. Another such pair of guide members are the carriage and cross feed associated therewith on a typical engine lathe. These guide members are provided with one or more flat machine surfaces which may be used as a measuring surface over which a metering wheel associated with the present invention travels.

In the past, various friction wheel measuring devices have been provided to furnish machinists with readings indicative of the movement between the above-mentioned guide members associated with machine tools. A common problem with such measuring devices is that they are not provided with an adequate means of calibration to compensate for the wear of internal parts and errors attributable to "gathering" effect. Wear of internal parts may result in slippage or backlash which adversely affects the accuracy of the readings. The "gathering" effect introduces error due to deformation of the surface material upon which pressure is exerted by a motion sensing or metering wheel. The amount of error due to "gathering" is dependent upon the properties of the guide surface and the metering wheel materials. Thus, friction wheel measuring devices may not be properly calibrated at the factory, but must be adjusted upon installation. While several devices have been proposed with means of compensation for gathering effect error, such have not included compensation for the wear of internal parts over a period of time.

It is an object of the present invention to provide a novel friction wheel measuring apparatus including means for compensation of error due to both gathering effect and the wear of internal parts which may occur over a period of time.

Another object of the present invention is to provide a versatile friction wheel measuring device which includes tapered motion transfer rollers and wheels which may be axially adjusted relative to each other to change the effective diameter ratio therebetween, thereby compensating for gathering effect error and errors attributable to the wear of internal parts.

It is a further object of the present invention to provide a unique friction wheel measuring device which includes a relatively large counting wheel having a circular groove formed therein carrying a plurality of abutting counting balls adapted to actuate a counting mechanism for digital readout of the measurements of travel between the associated guide members.

Still another object of the present invention is to provide a versatile friction wheel measuring device which is extremely accurate, compact, durable, and long lasting, yet, relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an elevational view of the measuring apparatus of the present invention mounted to a guide member of a typical piece of machinery.

FIG. 2 is a sectional view taken along section 2—2 of FIG. 1.

FIG. 3 is a sectional view taken along section 3—3 of FIG. 2.

FIG. 4 is a partial sectional view of the wiper assembly associated with the present invention.

FIG. 5 is a partial plan view of the wiper assembly shown in FIG. 4.

FIG. 6 is a partial elevational view of the counting wheel associated with the present invention.

FIG. 7 is a partial sectional view of a readout dial associated with a modified form of the present invention.

Referring now, more particularly, to FIGS. 1 and 2, the measuring apparatus of the present invention is generally indicated by the numeral 10 and includes a pair of oppositely disposed flange members 12 and 14 which are adapted to fit over a rail or guide member 16 associated with a typical piece of tooling machinery. In an actual installation, the measuring device 10 is affixed or connected to a second guide member associated with the same piece of machinery, such that relative movement between the guide members is measured by the apparatus, the readout of such measurement being visible through a display window 18 on the face of the apparatus housing 20.

Movement between the measuring apparatus and guide member 16 is sensed by a pair of metering rollers 22 and 24 which are adapted to engage guide member 16 for imparting rotation to a third metering roller 26 affixed to a motion sensing shaft 28. A pair of wiper arms 30 and 32 are pivotally mounted to the motion sensing shaft 28, as best illustrated in FIGS. 4 and 5. These arms are provided with relatively sharp end edge portions 34 and 36 which are adapted to clean the guide member during travel thereon. In addition, the wiper arms may be provided with a pair of felt pads 36 and 38 which also help to clean the surfaces of guide member 16 to assure positive engagement with the motion transfer rollers 22 and 24. A coil spring 42 extends around shaft 28 with its opposite ends engaging top surfaces of wiper arms 30 and 32 to bias them toward the guide member together with meter rollers 22 and 24 rotatably mounted to the wiper arms by way of shafts 23 and 25.

It will be appreciated that by providing a pair of meter rollers, rather than a single meter roller as with conventional measuring devices, a more positive transfer of motion to the secondary rollers is assured, in both directions of travel. In addition, the preferred embodiment of the present invention is provided with a pressure wheel or roller 44 engaging an opposite surface of guide member 16 under the influence of a pair of coil springs 46 of the compression type. Preferably, pressure roller 44 is mounted at its opposite ends to a pair of bearings 48 and 50 received by a pair of generally oblong slots 52 and 54 formed in the apparatus housing. Pressure of the coil springs 46 may be adjusted by a pair of setscrews 56, threadedly received by the housing. Thus, by adjusting setscrews 56, the most desirable pressures of the guide member surfaces against metering rollers 22 and 24 may be achieved. This arrangement, together with the above-described wiper arm assembly assures against slippage of the meter rollers during travel of the measuring apparatus relative to the guide member.

Rotation of the meter rollers is transferred to a tapered wheel 56 which is keyed or otherwise affixed to shaft 28. The tapered circumferential surfaces of wheel 56 are adapted to engage a pair of correspondingly tapered rollers 58 and 60, which, in turn, transmit motion to a third tapered roller 62 journaled to a support shaft 64 carried by bushings 66 and 68 mounted in housing 20. One end of shaft 64 is attached to a counting wheel 70 for rotation thereof to actuate a counting mechanism 72. In the preferred embodiment, the counting mechanism is provided with an actuation finger 74 which is sequentially engaged by a plurality of ball members 76 fixedly received in a circular groove formed in counting wheel 70. Thus, as the measuring apparatus is moved relative to guide member 16, counting wheel 70 is rotated a predetermined amount to actuate the counting mechanism, which, in turn, displays a number corresponding to the distance of travel. Preferably, each counting ball corresponds to a movement of one thousandth of an inch between the measuring apparatus and the associated guide member. The passage of each counting ball provides a corresponding actuation of the counting mechanism to display a new number in the readout window.

Referring to FIG. 7, a second embodiment of the readout mechanism associated with the present invention may be seen. It will be appreciated that instead of using digital counting mechanism 72 to indicate the distance traveled, a conventional dial-type indicator may be utilized. In this form of the invention, support shaft 64 extends beyond housing 20 and is adapted to rotate indicating needle 78 mounted on one end of the shaft to cooperate with a face plate dial 80 with measurement indicia imprinted thereon. A lens or crystal 82 may be snap-fitted or otherwise fastened to the housing to provide a viewing window such as with conventional measuring devices. Of course, in this form of the invention, the remainder of the measuring apparatus is identical to that described above, with the exception of counting wheel 70 which is not required.

As earlier mentioned, a common problem with conventional friction wheel measuring devices was that of calibration to compensate for gathering effect and errors due to the wear of internal parts over a period of time. Such a dual-purpose compensation or calibration is provided by way of the tapered surfaces associated with wheel 56 and rollers 58, 60 and 62. It will be appreciated that by changing the axial position between tapered roller 56 and rollers 58 and 60, the effective ratio between the diameters of these members may be varied. It should be noted that motion sensing shaft 28 is mounted in housing 20 in a manner to permit axial adjustment relative thereto. The axial position of shaft 28 is determined by coil compression spring 84 which presses against a bearing 86 near one end of the shaft, the opposite end of the shaft being provided with a second bearing 88 held in position by way of a pair of adjustable setscrews 90. Thus, by changing the positions of setscrews 90, the axial position of tapered wheel 56 is adjusted with respect to the corresponding tapered rollers 58 and 60 to change the ratio of the diameters and thus, the travel measurement. It will be appreciated that since the tapered motion transfer surfaces are at the measurement end of the motion transfer train, adjustment thereof is effective to compensate for both wear of the rotating parts as well as errors attributable to gathering effects. By moving shaft 28 in the downward direction, as shown in FIG. 2, the diameter ratio is decreased, requiring additional movement between guide member 16 and the measuring apparatus to achieve the same reading before such an adjustment was made. Contrastingly, movement of shaft 28 in the upward direction increases the diameter ratio, thereby requiring less movement between guide member 16 and the measuring apparatus to provide the same reading obtained prior to the adjustment.

Referring to FIG. 3, the coaction between the tapered wheel and rollers may be more fully appreciated. Tapered rollers 58 and 60 are mounted to a pair of lever arm members 92 and 94 each pivotally mounted near its center to support shaft 64. A coil tension spring 96 is fastened to opposite ends of lever arm members 92 and 94 in a manner which tends to bias rollers 58 and 60 toward each other and toward the tapered surfaces of wheel 56. In addition, it should be noted that the spacing between each tapered roller 58 and 56 and tapered roller 62 is preset to assure positive engagement between their corresponding tapered surfaces. Since the axis of rotation of the lever arms 92 and 94 is the same as that of tapered roller 62, rollers 58 and 60 remain in positive engagement with roller 62 regardless of the position they assume under the influence of coil spring 96. Thus, it will be appreciated that coil spring 96 assures positive engagement between the tapered rollers and tapered wheel regardless of roller wear or change in axial position for the purposes of calibration, as explained above.

It will be appreciated that the rollers and wheels associated with the present invention may be made from relatively rigid materials including steel, plastics or hard rubber. Of course, minor changes in materials or the number or exact location of the rollers or wheels is deemed to fall within the scope of the present invention. The measuring device of the present invention is capable of responding to the slightest movement between the apparatus and guide surface and eliminates errors due to wear, backlash, and gathering effect, and, is accurate to ten thousandth of an inch. Since accurate repeatability is assured, costly errors are reduced, resulting in a substantial savings in set-up time and labor costs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for measuring movement along a surface, said device comprising: a housing, a motion sensing roller rotatably mounted by said housing and adapted to engage the surface, a counting wheel operatively connected to said motion sensing roller, a continuous plurality of counting members mounted in a circular pattern around said counting wheel, and means adjacent said counting wheel for counting the number of members moved therepast and displaying a corresponding number representative of the distance moved over the surface, said counting members comprising a plurality of groove-mounted balls abutting each other around said circular pattern formed in said counting wheel.

2. The structure set forth in claim 1 wherein said counting means includes a movable sensing finger operatively engaging said circle of counting balls for movement thereby.

3. The structure set forth in claim 1 wherein said device includes a motion transfer wheel operatively connected to said motion sensing roller and having tapered circumferential side surfaces, and at least one oppositely tapered motion transfer roller engaging the tapered surfaces of said motion transfer wheel and being operatively connected to said counting wheel.

4. The structure set forth in claim 3 wherein said device includes means for adjustment of the axial position of said motion transfer wheel relative to said motion transfer roller to adjust the diameter ratio therebetween.

5. The structure set forth in claim 4 wherein said adjustment means includes screw means mounted in said housing for axial displacement of said motion transfer wheel relative to said motion transfer roller.

6. The structure set forth in claim 4 wherein said device includes means biasing said motion transfer roller and said motion transfer wheel together to assure positive frictional engagement therebetween.

7. The structure set forth in claim 6 wherein said device includes first and second motion transfer rollers engaging said motion transfer wheel, said motion transfer rollers being supported by a pair of pivotally mounted lever arms.

8. The structure set forth in claim 7 wherein said lever arms each has first and second ends and are pivotally mounted intermediate the first and second ends, said motion transfer rollers being mounted to said first ends, said biasing means including a tension spring mounted between the second ends of said lever arms to bias said motion transfer rollers toward each other and against said motion transfer wheel.

9. The structure set forth in claim 8 wherein said device includes a third motion transfer roller engaging said first and second motion transfer rollers and rotatably mounted about the pivot axis of said lever arms.

10. The structure set forth in claim 4 wherein said device includes first and second motion sensing rollers adapted to engage the surface for rotation during movement of the device relative to the surface, and a third motion sensing roller rotatably mounted by said housing and engaging said first and second motion sensing rollers, said third motion sensing roller and said motion transfer wheel being affixed to a common shaft for the transfer of rotation therebetween.

11. The structure set forth in claim 10 wherein said device includes a pair of cleaning arms pivotally mounted to said shaft and carrying said first and second motion sensing rollers.

12. The structure set forth in claim 11 wherein said device includes means biasing said motion sensing rollers and said cleaning arms toward the surface for the cleaning thereof during movement and to assure positive engagement between the motion sensing rollers and the surface.

13. A device for measuring movement along a surface, said device comprising: a housing, a motion sensing roller rotatably supported by said housing and adapted to engage the surface, first and second motion transfer members rotatable about first and second axes, respectively, and having oppositely tapered surfaces operatively engaging each other for the transfer of rotation therebetween, said first motion transfer member being operatively connected to said motion sensing roller, measurement indicating means operatively connected to said second tapered motion transfer member for providing measurement readings corresponding to the distance traveled over the surface, and means for adjusting the relative axial positions of said first and second tapered motion transfer members to change the effective diameter ratio therebetween to calibrate the device.

14. The structure set forth in claim 13 wherein one of said motion transfer members is affixed to a rotatable shaft supported by said housing, and said adjustment means includes means connected to said housing for selective axial displacement of said shaft.

15. The structure set forth in claim 14 wherein one end of said shaft is operatively engaged by a compression spring biasing the shaft in the axial direction and the opposite end of said shaft is operatively engaged by said adjustment means connected to said housing.

16. The structure set forth in claim 15 wherein said device includes means for biasing said first and second motion transfer members toward each other to insure positive frictional engagement therebetween.

17. The structure set forth in claim 16 wherein said device includes a third tapered motion transfer member engaging said first tapered motion transfer member, said second and third motion transfer members being rotatably supported by a pair of pivotally mounted lever arms.

18. The structure set forth in claim 17 wherein said lever arms each include first and second ends and are pivotally mounted intermediate the first and second ends, said second and third motion transfer members being rotatably mounted to said first lever ends, said biasing means including a tension spring mounted between the second ends of said lever arms to bias said second and third motion transfer members toward each other and against first motion transfer member.

19. The structure set forth in claim 18 wherein said device includes a fourth tapered motion transfer member engaging said second and third motion transfer members and rotatably mounted about the pivot axis of said lever arms.

20. A device for measuring movement, said device comprising: a housing, a motion sensing roller rotatably supported by said housing for sensing the movement to be measured, first and second motion transfer members rotatably supported by said housing and frictionally engaging each other for rotation about their respective axes, said first motion transfer member being operatively connected to said motion sensing roller, measurement indicating means operatively connected to said second motion transfer member for providing measurement readings corresponding to the movement, at least one of said motion transfer members including an axially tapered surface frictionally engaging the other motion transfer member to transfer rotation therebetween, and means for adjusting the relative axial positions of said first and second motion transfer members to selectively change the effective turn ratio therebetween.

21. The structure set forth in claim 20 wherein said device includes means for biasing said first and second motion transfer members toward each other to insure positive frictional engagement therebetween.

22. The structure set forth in claim 21 wherein said device includes a third motion transfer member engaging said first motion transfer member, said third motion transfer member and said second motion transfer member being rotatably supported by a pair of pivotally mounted lever arms.

23. The structure set forth in claim 22 wherein said lever arms each include first and second ends and are pivotally mounted intermediate said first and second ends, said third motion transfer member and said second motion transfer member geing rotatably mounted to said first lever ends, said biasing means including a tension spring mounted between said second lever ends to bias said third motion transfer member and said second motion transfer member toward said first motion transfer member.

24. The structure set forth in claim 23 wherein said device includes a fourth motion transfer member engaging said second and third motion transfer members and rotatably mounted about the pivot axis of said lever arms.

* * * * *